March 29, 1949.   A. BECOTE   2,465,835
CONTINUOUS FILM CINEMATOGRAPH APPARATUS
Filed Aug. 7, 1947
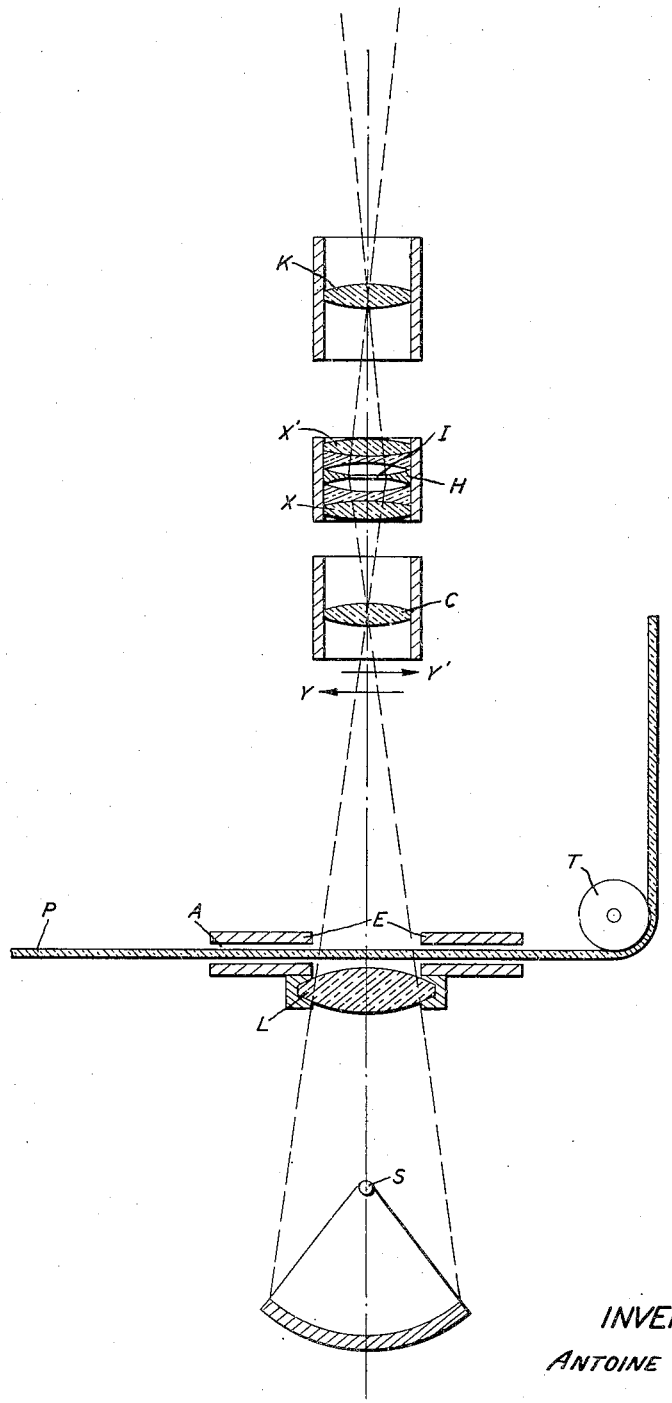
INVENTOR
ANTOINE BECOTE
BY Haseltine, Lake & Co.
AGENTS Patented Mar. 29, 1949

2,465,835

UNITED STATES PATENT OFFICE 2,465,835

CONTINUOUS FILM CINEMATOGRAPH APPARATUS

Antoine Becote, Saint Etienne, France

Application August 7, 1947, Serial No. 767,234
In France December 23, 1941

Section 1, Public Law 690, August 8, 1946
Patent expires December 23, 1961

2 Claims. (Cl. 88—16.8)

This invention relates to cinematograph apparatus, and has for its object to provide an improved form of apparatus of the type forming the subject of French Patent No. 783,926 of January 9, 1935 for "Improvements in cinematograph projection apparatus with continuous unwinding of the film." The drawing shows a diagrammatic view of the optical assembly according to the present invention.

A similar optical assembly has already been briefly described in prior patents, in particular French Patent No. 783,926. The construction according to this patent essentially comprises one or a plurality of input or field lenses of the system which are arranged behind the passage for the unwinding of the film, their purpose being to pick up the greatest number of light rays emitted by the projection lamp. Such lenses may be called collecting lenses.

The present invention consists in the provision in cinematograph apparatus of a fixed light collector directing the beam of light on to a vertically movable optical system, said optical system reproducing a reduced real or virtual image of the film in the gate interposed between fixed lenses forming collectors, said lenses then directing the image received on to the terminal enlarging objective which forms a convergent or divergent assembly.

The movable objective or optical system may comprise one or a plurality of groups of lenses having between them a point of conjugation in order to produce, according to the arrangement of said lenses at one or several times and finally a reduced and stationary picture of the moving film.

When the picture on the film is small, said picture may be retained at its original size. In certain cases it is even possible to neglect the size of the pictures on the film and retain said images in their initial sizes with this optical arrangement or with those already described. This (preferably) small image is then taken up by a collector which is composed as follows:

The gate serving to centre the picture on the screen is mounted with an assembly of one or a plurality of lenses arranged before and after said gate in order to allow all the light rays to pass through the axis of the system and thereby enable said rays to be perfectly received by the final objective for enlarging the picture on the screen. When the picture is enlarged several times, it is possible as just described, to provide each intermediate picture with collectors as previously mentioned. According to the composition of these optical assemblies the pictures or objects formed may assume the virtual or the real denomination.

These advantages can be applied to cameras as well as to the other conceptions already described.

In order that the invention may more easily be understood the same will now be described, by way of example, with reference to the accompanying drawing.

A light collector L placed behind the unwinding passage A for the film enables the maximum light to be picked up from the source of light S. The film P which is moved continuously by means of the drums T, passes through the passage A which is provided with an opening E corresponding to the size of two pictures on the film P. The film is illuminated by means of the source of light S.

At a distance, which varies according to the focal length adopted, there is arranged a movable optical system C serving to give a preferably reduced picture I of the film P, said picture I being kept stationary in space by the following arrangement which provides an optical compensation.

The optical system C is operated by a movement which consists in making it follow a picture on the film P. As soon as one of said pictures appears in the opening E of the passage A, the optical system C follows said picture while it is passing said opening, i. e. over a length of one picture.

The optical system then returns, i. e. moves upwards very quickly (which movement is screened by the shutter). In order to take up the next picture which has just appeared in the opening E, the movement of the optical system C starts again and continues as before. It should be noted that the smaller the picture the smaller will be the degree of movement of the optical system.

The synchronism of the movement with the unwinding of the film is obtained by means of drums T. The arrows Y—Y' in Fig. 1 indicate the direction of the reciprocating movement of the optical system or objective C. The picture is centred by means of the stop H which is combined with the lens or lenses X and X' forming collectors in order to enable all the light rays to be passed through the axis of the optical assembly; from there, the picture I which is formed in the empty space of the stop H is taken up by the objective K the function of which is to enlarge it on the screen.

I claim:

1. In a kinematographic apparatus of the continuous film advancing type, the provision of optical means including in linear sequence a source of light, a light collector, a film gate located in close proximity with the latter and through which the film is adapted to pass, an optical system adapted to produce a reduced image of the film portion passing through the gate, a stop provided at the location of the image thus formed for framing same and an objective adapted to enlarge the picture framed in said stop and means for reciprocating the first optical system along a line parallel to the progression of the film.

2. In a kinematographic apparatus of the continuous film advancing type, the provision of optical means including in linear sequence a source of light, a light collector, a film gate located in close proximity with the latter and through which the film is adapted to pass, an optical system adapted to produce a reduced image of the film portion passing through the gate, a stop provided at the location of the image thus formed for framing same and an objective adapted to enlarge the picture framed in said stop, means for reciprocating the first optical system along a line parallel to the progression of the film, and a collecting lens associated with the picture stop on at least one side thereof.

ANTOINE BECOTE.

REFERENCES CITED

The following references are of record in the file of this patent:

UNITED STATES PATENTS

| Number | Name | Date |
|---|---|---|
| 1,538,070 | Tenon | May 19, 1925 |
| 1,617,596 | Holman | Feb. 15, 1927 |
| 1,918,788 | Thorner | July 18, 1933 |
| 2,008,714 | Holman | July 23, 1935 |
| 2,345,602 | Holman | Apr. 4, 1944 |

FOREIGN PATENTS

| Number | Country | Date |
|---|---|---|
| 783,926 | France | Apr. 15, 1935 |